Nov. 9, 1948.  A. M. MARKS  2,453,379
MULTIPLY ANGLE SELECTIVE POLARIZER
Filed Sept. 28, 1943
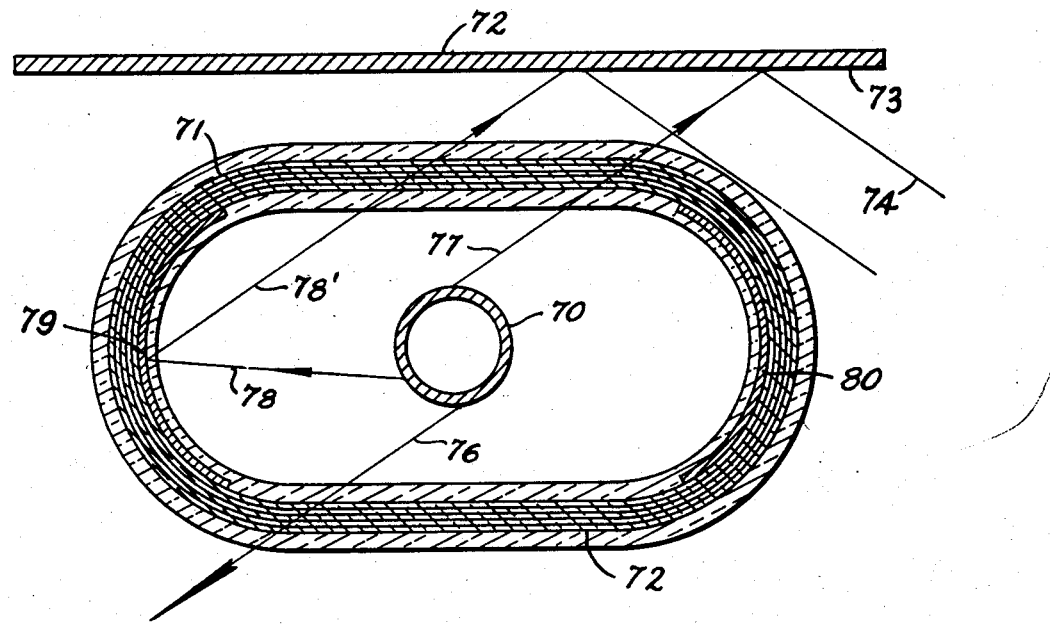
INVENTOR.
Alvin M. Marks
BY
Pineles + Greene
ATTORNEYS Patented Nov. 9, 1948

2,453,379

UNITED STATES PATENT OFFICE 2,453,379

MULTIPLY ANGLE SELECTIVE POLARIZER

Alvin M. Marks, New York, N. Y.

Application September 28, 1943, Serial No. 504,105

3 Claims. (Cl. 88—65)

My invention relates to a multi-ply polarizer comprising from fifty to one hundred separated transparent layers adapted to selectively transmit and polarize light. More particularly my invention relates to a polarizer comprising from sixty to eighty separated transparent layers of isotropic material, which polarizer is oval in cross section and functions to transmit only that light impinging thereon at an angle of approximately 33 degrees to the face surface thereof.

It is well known in the art of polarization to employ a plurality, for example, seven thin plates of glass for polarizing both the transmitted and reflected light therefrom. It has also been disclosed that a multiplicity of thin transparent plastic films may be employed. Such multi-layer polarizers require that light be directed thereupon in a specific direction, i. e. about thirty-three degrees in order that the emergent beam be properly polarized. Such polarizers are unsuited for polarizing light from a divergent light source, as for example from a diffusing surface, unless the rays are first parallelled by some means such as a reflector or lens system and then directed onto the multi-layer polarizing surface at an angle of about thirty-three degrees thereto.

It is the object of the present invention to provide a novel system for illumination of objects with glare free light.

The figure of the drawing is a cross sectional diagrammatic view of a lighting device of my invention adapted to emit polarized light at an angle of thirty-three degrees to the horizontal.

I have discovered that by employing a large number of transparent parallel isotropic layers numbering between fifty and one hundred and preferably in the range of sixty to eighty, when light from a multiplicity of directions is impinged upon such a multi-ply polarizer, it is either readily polarized and transmitted within a narrow range, i. e. about an angle of thirty-three degrees to the surface of the polarizer, or the light is almost totally reflected and/or absorbed if the direction of said rays is outside this narrow range.

Thus, an unpolarized beam impinging in a direction normal to such a multi-ply polarizer will be reflected almost totally from the multiple layers within the polarizer and substantially none of the light penetrates completely through all the layers. If the unpolarized beam impinges, for example, between twenty degrees and zero degrees to the surface of my polarizing means, substantially none of the light will penetrate the multi-ply polarizer.

The oval multi-ply polarizer shown in the drawing is particularly adapted for providing glare-free illumination for viewing surfaces. In the case of horizontal viewing surfaces such as the top of the desk, the floor, ceilings, etc., the axis of the multi-ply polarizer should be positioned horizontally, for example, above the plane of the desk, so that the rays proceeding at an angle of thirty-three degrees to the axis, also impinge upon the horizontal viewing surfaces at approximately thirty-three degrees thereto. The plane of polarization of the light emitted from the multi-ply polarizer is substantially normal to the plane of incidence of the light upon the viewing surface and hence both the direction of the ray and the polarizing plane thereof coact to produce glare-free illumination.

The thin plies of transparent plastic material are formed from any suitable substance, preferably a plastic such as a cellulose ester or ether or regenerated cellulose, or a resin such as a vinyl compound, such as vinyl acetal, vinyl butyral, or an acrylic compound such as methyl or ethyl or butyl methacrylate.

While the above materials are utilizable when in the isotropic state, it is preferred to have substances having an asymmetric molecular structure not adapted to crystallization so as to maintain the isotropic nature of the plastic under stresses which may be set up by drying or tensions induced in the process of tightly wrapping the layers.

In the drawing I show a lighting device by means of which light from a fluorescent source 70 is polarized and emitted from the device only in such planes and at such angles as to provide glare-free illumination. That is, light from the light source 70 passes either through the upper horizontal layer 71 which comprises a suitable multiplicity of thin isotropic plastic material, whereupon it illuminates a ceiling 72 or is reflected therefrom by means of a metallic reflecting coating 73 on the surface of the ceiling 72 down towards horizontal surfaces in the room. This light which is indicated at 74 is polarized in a plane normal to its plane of incidence upon horizontal surfaces and is directed at an angle of thirty-three degrees to the horizontal surfaces on which it impinges so that glare-free illumination thereof is provided. That is, this light upon striking light refracting bodies in a horizontal plane, passes into those horizontal bodies and no surface reflection or glare results.

In addition to the upwardly directed rays 71 and downwardly directed rays 76 from the light source 70, surface light is sidewardly projected such as the light indicated at 78. The ray 78 impinges upon the reflector 79 or 80, which diffusively reflects the light 78 at a multiplicity of angles, some of the light being in the proper angular range (see 78') approximately thirty-three degrees on to either the upper polarizing element 71 or the lower polarizing element 72. The reflectors 79 and 80 have depolarizing action and may, for example, comprise a coating of magnesium oxide or titanium oxide, and hence has a regenerative polarizing action, so that internally reflected light eventually is transmitted within the approximately thirty-two degree angular range or wholly absorbed internally.

Thus, the lighting fixture shown in the drawing utilizes substantially all of the available light from the source thereof converting that light to polarized light, polarized in the planes necessary and directing the light at the angles necessary for providing glare-free illumination for horizontal surfaces. This lamp is particularly suitable for a desk lamp or for illumination of a desk or other horizontal surfaces or for the illumination of a ceiling.

It will be obvious that if this lamp is turned at right angles to that shown in the drawing it can be used for the illumination of vertical surfaces as for example for the illumination of paintings or pictures or other material located on walls.

I claim:

1. A polarizing device comprising a multiplicity of thin transparent layers separated from one another by areas having abruptly different indices of refraction, said multiplicity of thin transparent layers being shaped substantially in the form of an oval having substantially parallel long sides, at least one light source positioned within said oval, the ends of said oval having internally reflecting surfaces positioned to direct light into said long sides so that polarized light is transmitted only though the long and substantially parallel sides.

2. A polarizing device comprising a multiplicity of thin transparent layers separated from one another by areas having abrutly different indices of refraction, said multiplicity of thin transparent layers being shaped substantially in the form of an oval having substantially parallel long sides, at least one light source positioned within said oval, the ends of said oval having internally reflecting surfaces positioned to direct light into said long sides so that polarized light is transmitted only through the long and substantially parallel sides, and a reflector positioned above said polarizing device, said reflector being substantially parallel to the adjacent long side so that polarized light transmitted through said adjacent side is reflected downwardly at an angle of about thirty-three degrees to the long sides of the oval.

3. A polarizing device comprising a multiplicity of thin transparent layers separated from one another by areas having abruptly different indices of refraction, said multiplicity of thin transparent layers being shaped substantially in the form of an oval having substantially parallel long sides, at least one light source positioned within said oval, the ends of said oval having internally reflecting surfaces so that polarized light is transmitted only through the long and substantially parallel sides, and an outer mirror like reflector positioned above and adjacent to said polarizing device, said outer reflector being greater in area than the adjacent long side of the polarizing oval and being substantially parallel to the adjacent long side so that polarized light transmitted through said adjacent side is reflected downwardly at an angle of about thirty-three degrees.

ALVIN M. MARKS.

REFERENCES CITED

The following references are of record in the file of this patent:

UNITED STATES PATENTS

| Number | Name | Date |
| --- | --- | --- |
| 685,780 | Martin | Nov. 5, 1901 |
| 1,580,180 | Derhoef | Apr. 13, 1926 |
| 1,733,915 | Short | Oct. 29, 1929 |
| 2,055,877 | Palmer | Sept. 29, 1936 |
| 2,075,065 | Ish-Shalam et al. | Mar. 30, 1937 |
| 2,252,898 | Pollack | Aug. 19, 1941 |
| 2,302,613 | Land | Nov. 17, 1942 |
| 2,363,689 | Rackett | Nov. 28, 1944 |

FOREIGN PATENTS

| Number | Country | Date |
| --- | --- | --- |
| 286,394 | Great Britain | Mar. 8, 1928 |
| 365,082 | Great Britain | Jan. 13, 1932 |
| 390,611 | Great Britain | Apr. 13, 1933 |
| 460,666 | Great Britain | Jan. 28, 1937 |
| 491,097 | Great Britain | Aug. 26, 1938 |
| 546,553 | Great Britain | July 20, 1942 |

OTHER REFERENCES

Brewster, A Treatise on Optics, 1853, pages 227–229, published Longman, Brown, Green, London.

Jenkins & White, Fundamentals of Physical Optics, 1937, published McGraw Hill Book Co., Inc., New York, pages 316, 317.